(12) United States Patent
Majid

(10) Patent No.: US 11,115,132 B2
(45) Date of Patent: Sep. 7, 2021

(54) METHOD AND APPARATUS FOR TRANSMITTING ELECTRIC SIGNALS OR POWER USING A FIBER OPTIC CABLE

(71) Applicant: Javid Majid, Houston, TX (US)

(72) Inventor: Javid Majid, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/708,945

(22) Filed: Dec. 10, 2019

(65) Prior Publication Data

US 2021/0175980 A1    Jun. 10, 2021

(51) Int. Cl.
G02B 6/44 (2006.01)
H04B 10/80 (2013.01)
E21B 47/135 (2012.01)
H04B 10/25 (2013.01)

(52) U.S. Cl.
CPC ......... *H04B 10/807* (2013.01); *E21B 47/135* (2020.05); *G02B 6/4415* (2013.01); *H04B 10/25891* (2020.05)

(58) Field of Classification Search
CPC ............ H04B 10/807; H04B 10/25891; E21B 47/135; G02B 6/4415
See application file for complete search history.

(56) References Cited

U.S. PATENT DOCUMENTS

| | | | | |
|---|---|---|---|---|
| 5,495,547 A | * | 2/1996 | Rafie | E21B 17/206 385/101 |
| 8,921,692 B2 | * | 12/2014 | Nelson | B29B 15/122 174/47 |
| 9,523,790 B1 | | 12/2016 | Valishin | |
| 10,087,717 B2 | * | 10/2018 | Varkey | E21B 41/00 |
| 10,170,219 B2 | * | 1/2019 | Willemoes | H01B 9/005 |
| 2013/0048373 A1 | * | 2/2013 | Fogg | D07B 1/147 174/70 R |

(Continued)

FOREIGN PATENT DOCUMENTS

WO    2010093649 A1    8/2010

OTHER PUBLICATIONS

International Search Report for International Application No. PCT/US2020/063015; filed Dec. 3, 2020; dated Mar. 16, 2021; 3 pages.

(Continued)

*Primary Examiner* — Ellen E Kim
(74) *Attorney, Agent, or Firm* — Cantor Colburn LLP

(57) ABSTRACT

A method for transmitting an optical signal and an electrical signal and/or power in a borehole penetrating the earth includes transmitting the optical signal using a hybrid fiber optic cable disposed in the borehole, the hybrid fiber optic cable includes an optical fiber for transmitting the optical signal. The method also includes transmitting the electrical signal and/or power using the hybrid fiber optic cable, the hybrid fiber optic cable further includes (i) a first electrically conductive sheath circumferentially surrounding the optical fiber and having a first electrical connector and (ii) a second electrically conductive sheath circumferentially surrounding the first electrically conductive sheath and having a second electrical connector for transmitting the electrical signal and/or power.

18 Claims, 3 Drawing Sheets

(56) References Cited

U.S. PATENT DOCUMENTS

2013/0294735 A1* 11/2013 Burris .................. G02B 6/4471
                                                    385/101
2017/0160503 A1   6/2017 Gao et al.
2017/0184804 A1*  6/2017 Lowell .................. G02B 6/443
2017/0363830 A1  12/2017 Park et al.
2019/0136639 A1   5/2019 Bhongale et al.
2020/0110235 A1*  4/2020 Maida .................. G02B 6/4416

OTHER PUBLICATIONS

Written Opinion for International Application No. PCT/US2020/063015; filed Dec. 3, 2020 dated Mar. 16, 2021; 4 pages.

* cited by examiner

METHOD AND APPARATUS FOR TRANSMITTING ELECTRIC SIGNALS OR POWER USING A FIBER OPTIC CABLE

BACKGROUND

Boreholes are typically drilled into earth formations to explore for and extract hydrocarbons. Once a reservoir of hydrocarbons is discovered, borehole completion activities are required before the hydrocarbons can be extracted.

Some borehole completion activities include disposing completion equipment, material or structures into a borehole. For example, the borehole may be lined with a casing that is then cemented in place. In another example, acid may be disposed in the casing in order to open up any obstructions in perforations in the casing to allow the flow of hydrocarbons. Many of these downhole completion activities need to be monitored by a completion specialist at the surface of the earth in order to ensure that an activity is working or has been completed correctly.

Parameters such as temperature, pressure, and acoustic energy may be monitored downhole using a discrete or distributed sensing system based on a response of an optical fiber to the parameter. In addition, other types of monitoring may be required based on an electrical device such as an electro-mechanical transducer or an electronic-based transducer such as a photodetector which may require electrical power and/or electrical communication. In addition, downhole electronics may be needed to process or transmit data. Hence, improvements in implementing downhole monitoring would be well received in the hydrocarbon production industry.

BRIEF SUMMARY

Disclosed is a method for transmitting an optical signal and an electrical signal and/or power in a borehole penetrating the earth. The method includes: transmitting the optical signal using a hybrid fiber optic cable disposed in the borehole, the hybrid fiber optic cable includes an optical fiber for transmitting the optical signal; and transmitting the electrical signal and/or power using the hybrid fiber optic cable, the hybrid fiber optic cable further includes (i) a first electrically conductive sheath circumferentially surrounding the optical fiber and having a first electrical connector and (ii) a second electrically conductive sheath circumferentially surrounding the first electrically conductive sheath and having a second electrical connector for transmitting the electrical signal and/or power.

Also disclosed is a hybrid fiber optic cable for transmitting an optical signal and an electrical signal and/or power in a borehole penetrating the earth. The hybrid fiber optic cable includes: an optical fiber disposed in the borehole; a first electrical conductor circumferentially surrounding the optical fiber; a first electrical connector in electrical communication with the first electrical conductor; a second electrical conductor circumferentially surrounding the first electrical conductor; and a second electrical connector in electrical communication with the second electrical conductor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are methods and apparatus for transmitting electric signals and/or electric power. The methods and apparatus use embodiments of a hybrid fiber optic cable. The hybrid fiber optic cable includes an optical component and an electrical component. The optical component uses an optical fiber for optical sensing and/or optical signal transmission. The electrical component uses at least two coaxial electrically conductive sheaths that circumferentially surround the optical fiber along the length of the hybrid fiber optic cable. These sheaths may also provide mechanical protection to the optical fiber. Each electrically conductive sheath includes an electrical connector at each end to enable an electrical connection to an electrical or electronic device.

Figure 1:
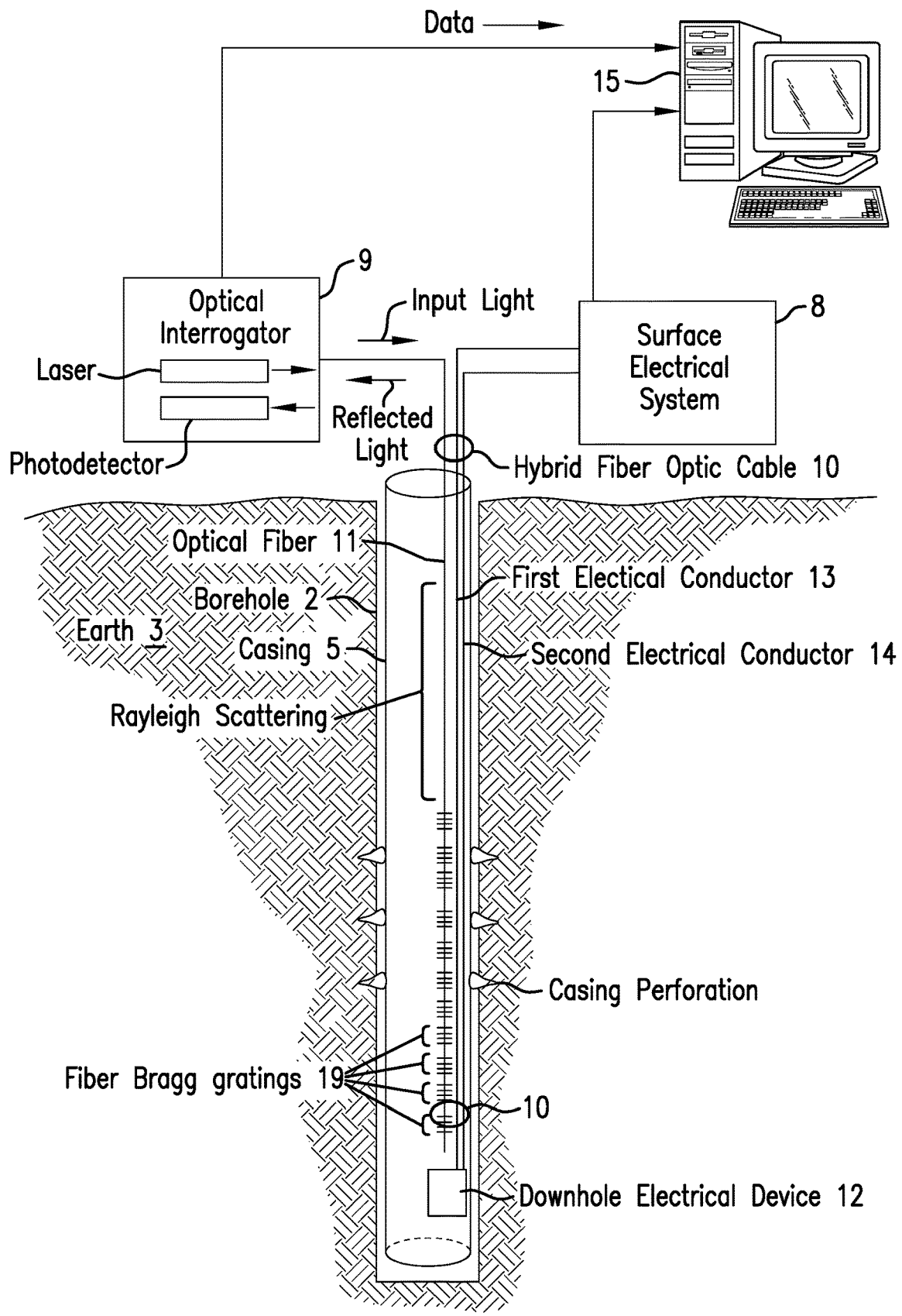
FIG. 1 illustrates a cross-sectional view of an embodiment of a hybrid fiber optic cable disposed in a borehole penetrating the earth.

FIG. 1 illustrates a cross-sectional view of a hybrid fiber optic cable 10 disposed in a borehole 2 penetrating the earth 3 having a formation, which contains a reservoir of hydrocarbons. The borehole 2 is lined with a casing 5. The casing 5 may have perforations to allow hydrocarbons to flow into the casing 5 where they are pumped to the surface for production purposes.

The hybrid fiber optic cable 10 is configured to sense a parameter of interest at distributed locations along the length of the hybrid fiber optic cable 10 in an embodiment referred to as distributed optical sensing. Alternatively, the parameter of interest may be sensed at a discrete location. Non-limiting embodiments of the sensed parameter include temperature, pressure, and acoustic energy magnitude and frequency. Acoustic energy can be inclusive of sound energy and/or seismic energy. Sound energy for example may result from the inflow of hydrocarbons through the perforations. Distributed optical sensing may be based on Rayleigh scattering in which reflective imperfections in an optical fiber 11 scatter or reflect light according to a spacing between the reflective imperfections. Thus, as a value of a sensed parameter changes, the spacing between the reflective imperfections changes resulting in a change to the reflected light which can be measured to sense a value of the parameter or a change in the value of the parameter. Alternatively or in addition to Rayleigh scattering, the parameter may be sensed using fiber Bragg gratings (FBGs) 19 inscribed in the optical fiber 11 where a spacing between the FBGs changes in response to a change in the value of the parameter being sensed. Other optical sensing techniques may also be used.

In the embodiment of FIG. 1, the hybrid fiber optic cable 10 is electrically connected to a downhole electrical device 12 using a first electrical conductor 13 and a second electrical conductor 14 of the hybrid fiber optic cable 10. Non-limiting embodiments of the downhole electrical device 12 include an electro-mechanical device such as an acoustic transducer, an electronic device such as a photodetector, or a processing device for processing data and/or transmitting the data to the surface. The photodetector such as a photomultiplier tube may be integrated into a radiation detector.

At the surface, the optical fiber 11 (i.e., the optical component) is optically connected to an optical interrogator 9 using an optical connection as known in the art. The optical interrogator 9 is configured to interrogate the optical fiber 11 to determine sensed strain values and their locations. The sensed strain values can then be correlated to the parameter of interest or a change in the parameter of interest. The interrogation is performed by transmitting input light (e.g., a light pulse) from a light source, which can be a laser, into the optical fiber 11. Light reflected in the optical fiber 11 is received by the optical interrogator 9 and generates an interference pattern that is detected by a photo-detector. Each reflective imperfection or FBG has a "normal" or reference spacing with respect to an adjacent reflective imperfection or FBG. As each reflective imperfection or FBG is exposed to the parameter being sensed, the reflective imperfection or FBG may experience a shift in the spacing from the normal spacing based on a magnitude or intensity of the strain imparted by the parameter. The shift in spacing then results is a change in the interference pattern established in the optical interrogator 9, which is then correlated to a measured value. In one or more embodiments, the optical interrogator 9 may perform Optical Time Domain Reflectometry (OTDR) as is known in the art. Other known reflectometry methods may also be used. In other embodiments, the optical fiber 11 may be used as an optical medium to transmit an optical signal either from the surface to a downhole optical device or from the downhole optical device to the surface.

Also at the surface, the first electrical conductor 13 and the second electrical conductor 14 (i.e., the electrical component) are electrically connected to a surface electrical system 8. Non-limiting embodiments of the surface electrical system include one or more of an electrical signal receiver, an electrical signal transmitter, an electrical signal transceiver, an electrical signal processor, a controller, and an electrical power supply.

A computer processing system 15 disposed at the surface may receive data from the optical interrogator 9 and/or the surface electrical system 8 for processing, recording, and/or display purposes.

Figure 2:
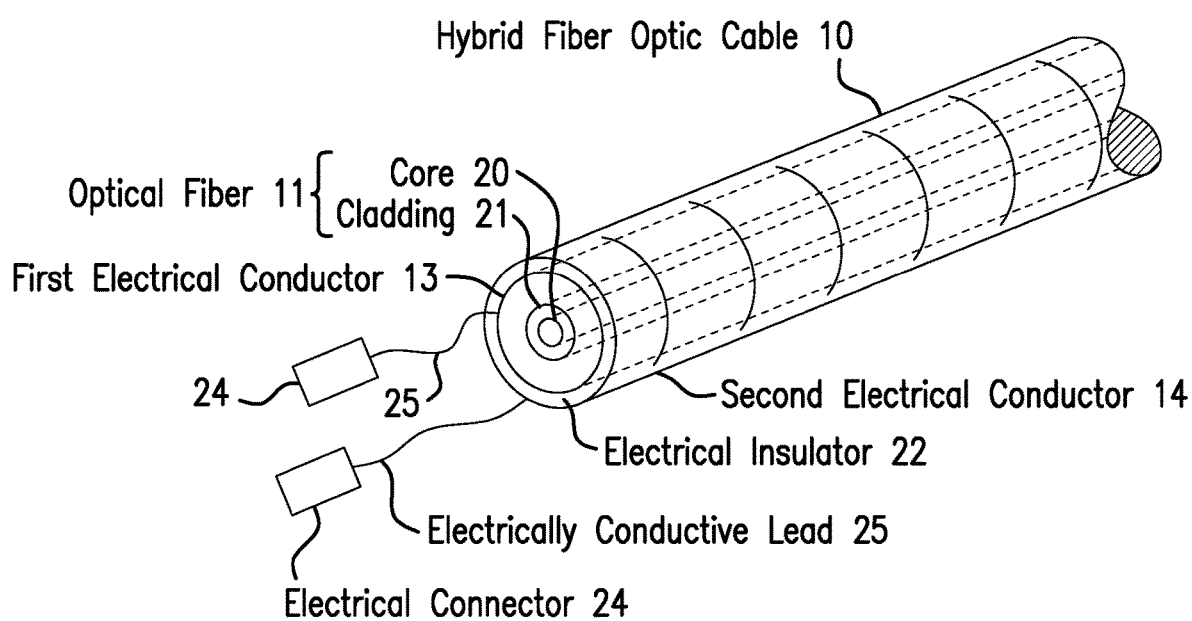
FIG. 2 depicts aspects of the hybrid fiber optic cable.

FIG. 2 depicts aspects of the hybrid fiber optic cable 10. The optical component of the hybrid fiber optic cable 10 includes the optical fiber 11, which can include a core 20 surrounded by a cladding 21. The cladding 21 has an index of refraction that is greater than the index of refraction of the core 20 in order to keep the input light and light signals traveling within the core 20 without leaking out.

The electrical component of the hybrid fiber optic cable 10 includes the first electrical conductor 13 in the form of a sheath, such as a metallic sheath, circumferentially surrounding the optical fiber 11. The electrical component of the hybrid fiber optic cable 10 also includes the second electrical conductor 14 in the form of a sheath, such as a metallic sheath, circumferentially surrounding the first electrical conductor 13 with an electrical insulator 22 disposed therebetween. Each metallic sheath may be made of a metal suitable for use as a sheath. In one or more embodiments, the first and second electrical conductors 13 and 14 are made of stainless steel or a nickel allow such as Inconel to survive the downhole environment. Other electrically conductive metals or materials may also be used. Each end of the first electrical conductor 13 and the second electrical conductor 14 at both ends of the hybrid fiber optic cable 10 is terminated with an electrical connector 24. Non-limiting embodiments of the electrical connector 24 or end-portion of the electrical connector that does the connecting include a ring-tongue connector, a spade connector, a pin connector, a soldering pad connector, or other type of electrical connector known in the art. In one or more embodiments, the electrical connector 24 is welded, soldered, fastened or crimped to the first and second electrical conductors 13 and 14. In one or more embodiments, the electrical connector 24 may include an electrically conductive "pig-tail" or lead 25, such as a wire, that is connected to the first and/or second electrical conductors 13 and 14. The electrically conductive lead 25 thus extends the electrical connector 24 away from the first and/or second electrical conductors 13 and 14 in order to provide some extra length for making the connections. The electrically conductive lead may also be welded, soldered, fastened, or crimped to the first and/or second electrical conductors 13 and 14. In one or more embodiments, the electrical connectors 24 for the first and second electrical connectors 13, 14 may be integrated into one electrical connector incorporating two or more electrical conductors. Alternatively, the electrical connector 24 may include electrically conductive material of the first and/or second electrical conductors 13 and 14 that is extended beyond the ends of the hybrid fiber optic cable 10 such as in the form of a strip so that the strip can be welded, soldered, crimped, or fastened with a fastener such as a screw to a termination point.

It can be appreciated that the hybrid fiber optic cable 10 may include multiple optical fibers 11 where all of the optical fibers 11 are disposed within the sheath of the first electrical conductor 13. In one or more embodiments having multiple optical fibers 11, one or more of the optical fibers 11 can be used for sensing applications while one or more other optical fibers can be used to transmit an optical signal from a downhole optical device to a surface optical signal receiver or processor.

Figure 3:
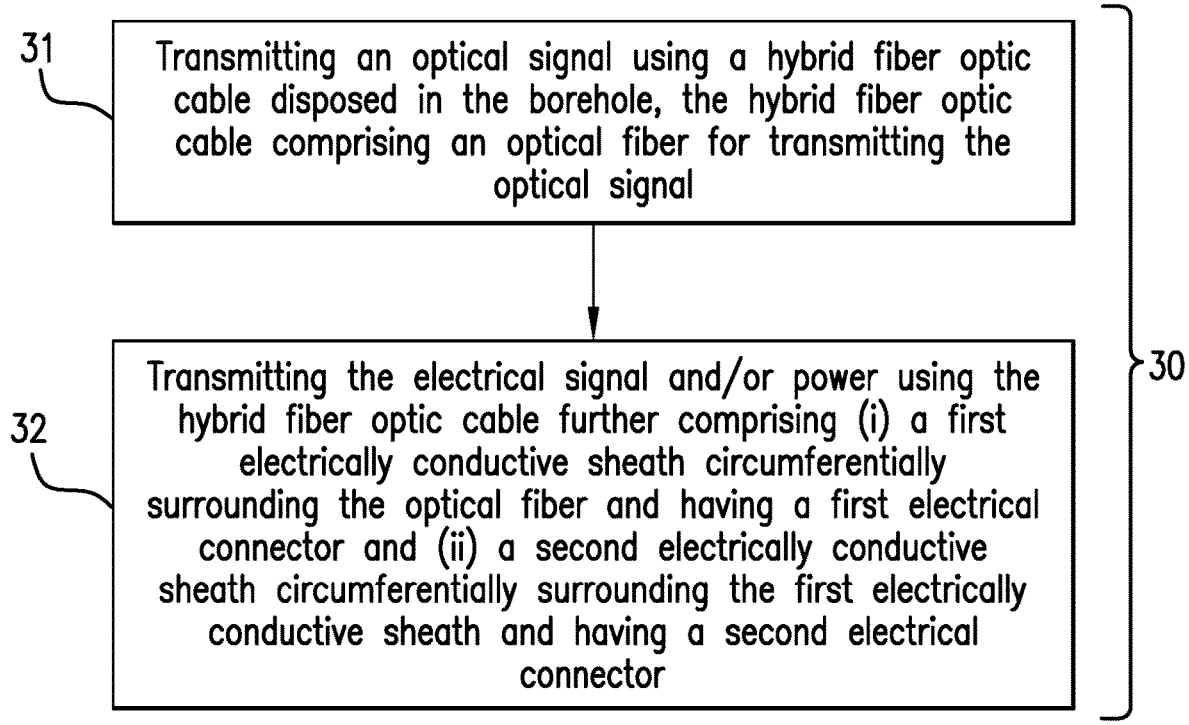
FIG. 3 is a flow chart for a method for transmitting an optical signal and an electrical signal and/or power in a borehole penetrating the earth.

FIG. 3 is a flow chart for a method 30 for transmitting an optical signal and an electrical signal and/or power in a borehole penetrating the earth. Block 31 calls for transmitting the optical signal using a hybrid fiber optic cable disposed in the borehole, the hybrid fiber optic cable comprising an optical fiber for transmitting the optical signal. Block 32 calls for transmitting the electrical signal and/or power using the hybrid fiber optic cable further comprising (i) a first electrically conductive sheath circumferentially surrounding the optical fiber and having a first electrical connector and (ii) a second electrically conductive sheath circumferentially surrounding the first electrically conductive sheath and having a second electrical connector. Transmitting the electrical signal and/or power includes transmitting the electrical signal and/or power through the first and second electrical connectors.

The method 30 may also include sensing a parameter downhole using the optical fiber and interrogating the optical fiber using an optical interrogator to determine the parameter.

The method 30 may also include sensing a parameter downhole using a downhole electrical device and transmitting sensed data from the downhole electrical device to the surface using the first electrically conductive sheath and the second electrically conductive sheath.

The method 30 may also include processing data downhole using a downhole electrical device and transmitting the data to the surface using the first electrically conductive sheath and the second electrically conductive sheath.

The method 30 may also include transmitting electric power from a surface power supply to a downhole electrical device using the first electrically conductive sheath and the second electrically conductive sheath. It can be appreciated that both electric power and one or more electrical signals may be transmitted over one set of first and second electrically conductive sheaths where the electrical signals are imposed over the electric power using transmission techniques known in the art.

The disclosure herein provides several advantages. One advantage is that since only one cable may be required to both (1) optically sense a parameter or transmit an optical signal and (2) transmit an electrical signal and/or power, less time for installation may be required compared to embodiments requiring separate fiber optic cables and electrical cables. Another advantage is that using only a single hybrid fiber optic cable as opposed to separate fiber optic and electrical cables uses less space downhole. Yet another advantage is increased reliability from the use of one cable that performs both optical and electrical tasks as opposed to two separate cables.

Set forth below are some embodiments of the foregoing disclosure:

Embodiment 1: A method for transmitting an optical signal and an electrical signal and/or power in a borehole penetrating the earth, the method comprising: transmitting the optical signal using a hybrid fiber optic cable disposed in the borehole, the hybrid fiber optic cable comprising an optical fiber for transmitting the optical signal; and transmitting the electrical signal and/or power using the hybrid fiber optic cable, the hybrid fiber optic cable further comprising (i) a first electrically conductive sheath circumferentially surrounding the optical fiber and having a first electrical connector and (ii) a second electrically conductive sheath circumferentially surrounding the first electrically conductive sheath and having a second electrical connector for transmitting the electrical signal and/or power.

Embodiment 2: The method according to any previous embodiment, further comprising sensing a parameter downhole using the optical fiber.

Embodiment 3: The method according to any previous embodiment, further comprising interrogating the optical fiber using an optical interrogator to determine the parameter.

Embodiment 4: The method according to any previous embodiment, further comprising sensing a parameter downhole using a downhole electrical device and transmitting sensed data from the downhole electrical device to the surface using the first electrically conductive sheath and the second electrically conductive sheath.

Embodiment 5: The method according to any previous embodiment, further comprising processing data downhole using a downhole electrical device and transmitting the data to the surface using the first electrically conductive sheath and the second electrically conductive sheath.

Embodiment 6: The method according to any previous embodiment, further comprising transmitting electric power from a surface power supply to a downhole electrical device using the first electrically conductive sheath and the second electrically conductive sheath.

Embodiment 7: The method according to any previous embodiment, wherein transmitting the electrical signal and/or power comprises transmitting the electrical signal and/or power through the first and second electrical connectors.

Embodiment 8: A hybrid fiber optic cable for transmitting an optical signal and an electrical signal and/or power in a borehole penetrating the earth, the hybrid fiber optic cable comprising: an optical fiber disposed in the borehole, a first electrical conductor circumferentially surrounding the optical fiber, a first electrical connector in electrical communication with the first electrical conductor, a second electrical conductor circumferentially surrounding the first electrical conductor, and a second electrical connector in electrical communication with the second electrical conductor.

Embodiment 9: The hybrid fiber optic cable according to any previous embodiment, wherein at least one of the first electrical connector and the second electrical connector comprises an electrical lead.

Embodiment 10: The hybrid fiber optic cable according to any previous embodiment, wherein each of the first electrical conductor and the second electrical conductor are in the form or a metallic sheath.

Embodiment 11: The hybrid fiber optic cable according to any previous embodiment, wherein the optical fiber is optically connected to an optical interrogator for determining a parameter sensed by the optical fiber.

Embodiment 12: The hybrid fiber optic cable according to any previous embodiment, wherein the first electrical conductor and the second electrical conductor are electrically connected to a downhole electrical device and to a surface electrical system.

Embodiment 13: The hybrid fiber optic cable according to any previous embodiment, wherein the downhole electrical device is configured to sense a parameter downhole.

Embodiment 14: The hybrid fiber optic cable according to any previous embodiment, wherein the downhole electrical device is configured to process data in the borehole and transmit the data using the first electrical conductor and the second electrical conductor.

Embodiment 15: The hybrid fiber optic cable according to any previous embodiment, wherein the optical fiber comprises a plurality of optical fibers.

Embodiment 16: The hybrid fiber optic cable according to any previous embodiment, wherein at least one of the first electrical conductor and the second electrical conductor comprises a plurality of electrical conductors.

In support of the teachings herein, various analysis components may be used, including a digital and/or an analog system. For example, the surface electrical system 8, the optical interrogator 9, the downhole electrical device 12, and/or the computer processing system 15 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for transmitting an optical signal and an electrical signal and/or power in a borehole penetrating the earth, the method comprising:
   transmitting the optical signal using a hybrid fiber optic cable disposed in the borehole, the hybrid fiber optic cable comprising an optical fiber for transmitting the optical signal; and
   transmitting the electrical signal and/or power using the hybrid fiber optic cable, the hybrid fiber optic cable further comprising (i) a first electrically conductive sheath circumferentially surrounding the optical fiber and in electrical communication with a first electrical connector and (ii) a second electrically conductive sheath circumferentially surrounding the first electrically conductive sheath and in electrical communication with a second electrical connector for transmitting the electrical signal and/or power.

2. The method according to claim 1, further comprising sensing a parameter downhole using the optical fiber.

3. The method according to claim 2, further comprising interrogating the optical fiber using an optical interrogator to determine the parameter.

4. The method according to claim 1, further comprising sensing a parameter downhole using a downhole electrical device and transmitting sensed data from the downhole electrical device to the surface using the first electrically conductive sheath in electrical communication with the first electrical connector and the second electrically conductive sheath in electrical communication with the second electrical connector.

5. The method according to claim 1, further comprising processing data downhole using a downhole electrical device and transmitting the data to the surface using the first electrically conductive sheath in electrical communication with the first electrical connector and the second electrically conductive sheath in electrical communication with the second electrical connector.

6. The method according to claim 1, further comprising transmitting electric power from a surface power supply to a downhole electrical device using the first electrically conductive sheath in electrical communication with the first electrical connector and the second electrically conductive sheath in electrical communication with the second electrical connector.

7. The method according to claim 1, wherein transmitting the electrical signal and/or power comprises transmitting the electrical signal and/or power through the first and second electrical connectors.

8. A hybrid fiber optic cable for transmitting an optical signal and an electrical signal and/or power in a borehole penetrating the earth, the hybrid fiber optic cable comprising:
   an optical fiber disposed in the borehole;
   a first electrical conductor circumferentially surrounding the optical fiber;
   a first electrical connector in electrical communication with the first electrical conductor;
   a second electrical conductor circumferentially surrounding the first electrical conductor; and
   a second electrical connector in electrical communication with the second electrical conductor.

9. The hybrid fiber optic cable according to claim 8, wherein at least one of the first electrical connector and the second electrical connector comprises an electrical lead.

10. The hybrid fiber optic cable according to claim 8, wherein each of the first electrical conductor and the second electrical conductor are in the form of a metallic sheath having a circular cross-section.

11. The hybrid fiber optic cable according to claim 8, wherein the optical fiber is optically connected to an optical interrogator for determining a parameter sensed by the optical fiber.

12. The hybrid fiber optic cable according to claim 8, wherein the first electrical conductor and the second electrical conductor are electrically connected to a downhole electrical device and to a surface electrical system using the first electrical connector and the second electrical connector.

13. The hybrid fiber optic cable according to claim 12, wherein the downhole electrical device is configured to sense a parameter downhole.

14. The hybrid fiber optic cable according to claim 12, wherein the downhole electrical device is configured to process data in the borehole and transmit the data using the first electrical conductor in electrical communication with the first electrical connector and the second electrical conductor in electrical communication with the second electrical connector.

15. The hybrid fiber optic cable according to claim 8, wherein the optical fiber comprises a plurality of optical fibers.

16. The hybrid fiber optic cable according to claim 8, wherein at least one of the first electrical conductor and the second electrical conductor comprises a plurality of electrical conductors.

17. The method according to claim 7, wherein the electrical signal and/or power is transmitted through the first and second electrical connectors using at least one of a welded, soldered, crimped, or mechanically fastened connection.

18. The hybrid fiber optic cable according to claim 8, wherein at least one of (i) the first electrical connector is connected to the first electrical conductor or (ii) the second electrical connector is connected to the second electrical conductor by at least one of a welded, soldered, crimped, or mechanically fastened connection.

* * * * *